(12) United States Patent
Asada et al.

(10) Patent No.: US 7,102,851 B2
(45) Date of Patent: Sep. 5, 2006

(54) HYDRODYNAMIC BEARING AND DISK RECORDING/REPRODUCING APPARATUS

(75) Inventors: Takafumi Asada, Hirakata (JP); Hiroaki Saito, Ozu (JP); Keigo Kusaka, Ozu (JP); Daisuke Itou, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 461 days.

(21) Appl. No.: 10/727,448

(22) Filed: Dec. 3, 2003

(65) Prior Publication Data

US 2004/0179294 A1   Sep. 16, 2004

(30) Foreign Application Priority Data

Dec. 6, 2002   (JP) ............................. 2002-355155

(51) Int. Cl.
*G11B 17/02*   (2006.01)
(52) U.S. Cl. .................... 360/99.08; 384/107
(58) Field of Classification Search .................. None
See application file for complete search history.

(56) References Cited

U.S. PATENT DOCUMENTS

| | | | | |
|---|---|---|---|---|
| 5,707,154 A * | 1/1998 | Ichiyama | .................... | 384/107 |
| 5,977,674 A * | 11/1999 | Leuthold et al. | .............. | 310/90 |
| 6,130,802 A * | 10/2000 | Rahman et al. | .......... | 360/99.08 |
| 6,292,328 B1 * | 9/2001 | Rahman et al. | .......... | 360/99.08 |
| 6,307,293 B1 * | 10/2001 | Ichiyama | ................... | 310/90.5 |
| 6,361,214 B1 * | 3/2002 | Ichiyama | .................... | 384/107 |
| 6,362,932 B1 * | 3/2002 | Bodmer et al. | .......... | 360/99.08 |
| 6,364,532 B1 * | 4/2002 | Yoshikawa et al. | ......... | 384/107 |
| 6,404,087 B1 * | 6/2002 | Ichiyama | .................... | 310/90 |
| 6,493,181 B1 * | 12/2002 | Ichiyama | ................ | 360/99.08 |
| 6,678,115 B1 * | 1/2004 | Khan | ...................... | 360/99.08 |
| 6,831,812 B1 * | 12/2004 | Sode et al. | ............. | 360/99.08 |

* cited by examiner

*Primary Examiner*—Robert S. Tupper
(74) *Attorney, Agent, or Firm*—Akin Gump Strauss Hauer & Feld, LLP

(57) ABSTRACT

A sleeve 1 is fixed on a base. Radial dynamic-pressure generating grooves 1A and 1B are provided on an inner surface of the sleeve 1. A thrust plate 4 hermetically seals a lower opening end of the sleeve 1. A shaft 2 is inserted inside the sleeve 1, being allowed to revolve. A flange 3 is fixed at the bottom end of the shaft 2, and its lower surface is placed close to an upper surface of the thrust plate 4. Thrust dynamic-pressure generating grooves 3A and 3B are provided on the surfaces of the flange 3. Gaps A–H among the sleeve 1, the shaft 2, the flange 3, and the thrust plate 4 are filled with a lubricant 5. Hollows 1C–1F are provided on the inner surface of the sleeve 1. The gaps A and C over the thrust dynamic-pressure generating grooves 3A and 3B and their vicinities are narrower than the surrounding gaps B and D (A<B, A<D, C<B, and C<D), and the surrounding gaps B and D are narrower than the gap H in the upper opening end of the sleeve 1 and its vicinity (B<H and D<H). The gaps E and G over the radial dynamic-pressure generating grooves and their vicinities are narrower than the surrounding gaps D and F (E<D, E<F, G<D, and G<F), and the surrounding gaps D and F are narrower than the gap H in the upper opening end of the sleeve 1 and its vicinity (D<H and F<H).

6 Claims, 7 Drawing Sheets

HYDRODYNAMIC BEARING AND DISK RECORDING/REPRODUCING APPARATUS

BACKGROUND OF THE INVENTION

The present invention relates to hydrodynamic bearings and disk recording/reproducing apparatuses equipped with them.

Disk recording/reproducing apparatuses include magnetic disks and magnetically or optically perform reading and writing of data for the magnetic disks while revolving the magnetic disks. Further increases in capacity and speedups of data transfers are required of disk recording/reproducing apparatuses. Accordingly, it is desired that revolutions of the magnetic disks become still faster and are stabilized with still higher precision. Hydrodynamic bearings are suitable for such high-speed and high-precision rotary drive systems.

FIG. 6 is a cross-sectional view showing an example of conventional hydrodynamic bearings. The top end of a shaft 31 is fixed on the center of a hub 36. A flange 33 in an annular shape allows the bottom end of the shaft 31 to pass through its inside and is fixed at the bottom end of the shaft 31. Thrust dynamic-pressure generating grooves 33A and 33B are provided on surfaces of the flange 33. An outer surface of a sleeve 32 is fixed on a base 35, and an inner surface 32A of the sleeve 32 surrounds the shaft 31. The flange 33 is then placed in a hollow 32D formed by a bottom surface of the sleeve 32 and an inner surface of the base 35. A thrust plate 34 is fixed on the base 35 and closes the lower side of a space surrounded by the sleeve 32 and the base 35. The upper surface of the thrust plate 34 is then opposed to the lower surface of the flange 33. In this hydrodynamic bearing, in particular, the thrust plate 34 completely cuts off gaps among the flange 33, the sleeve 32, and the base 35 from the outside space. Radial dynamic-pressure generating grooves are provided on one or both of a side of the shaft 31 and an inner surface of the sleeve 32. Radial dynamic-pressure generating grooves are usually provided on two regions, a first region 32B near the flange 33 and a second region 32C near the upper opening end of the sleeve 32 (see broken lines shown in FIG. 6.) The thrust dynamic-pressure generating grooves 33A and 33B and the radial dynamic-pressure generating grooves 32B and 32C are, for example, herringbone-shaped grooves. Gaps among the shaft 31, the sleeve 32, the thrust plate 34, and the base 35 are filled with oil 42. Magnetic disks 39 are fixed on the outer surface of the hub 36, being concentric with the shaft 31. Generally, several sheets of the magnetic disks 39 are installed. The spacers 40 are installed between inner radii of the magnetic disks 39, and the clamper 41 further presses down the inner radii of the magnetic disks 39 from the top. Thereby, the magnetic disks 39 are fixed on the hub 36. Magnets 38 are installed on the inner surfaces of the hub 36. On the other hand, stators 37 are installed on the base 35 and opposed to the magnets 38.

The above-described hydrodynamic bearing operates as follows. Rotating magnetic fields occur when the stators 37 are energized. The hub 36 undergoes a torque from the rotating magnetic fields through the magnets 38. Thereby, the shaft 31, the hub 36, and the magnetic disks 39 revolve in a body around the shaft 31. During the revolution, the oil 42 flows along the radial dynamic-pressure generating grooves and is concentrated in each central part of the first region 32B and the second region 32C. As a result, pressure in the radial direction of the shaft 31 is enhanced in those central parts. This pumping effect maintains stable spacing between the shaft 31 and the sleeve 32, and thereby the rotation axis of the magnetic disks 39 does not substantially shift in the radial direction of the shaft 31. Similarly, the oil 42 flows along the thrust dynamic-pressure generating grooves 33A and 33B and is concentrated in each central part of regions where the thrust dynamic-pressure generating grooves 33A and 33B are provided. As a result, pressure in the axial direction of the shaft 31 is enhanced on surfaces of the flange 23. This pumping effect maintains stable spacing between the flange 33 and the sleeve 32 and stable spacing between the flange 33 and the thrust plate 34. Therefore, the rotation axis of the magnetic disks does not substantially tilt from the axial direction of the shaft 31. Thus, the above-described hydrodynamic bearing maintains the high-speed revolution of the magnetic disks 39 stable with high precision.

In such a conventional hydrodynamic bearing as the above-described one, the above-described pumping effects are fully exerted under the condition with the oil 42 covering the whole of the radial dynamic-pressure generating grooves 32B and 32C and the whole of the thrust dynamic-pressure generating grooves 33A and 33B. However, an abundance of minute air bubbles (microbubbles) intrudes into the oil 42, for example, after a time lapse of use. The microbubbles accumulate particularly in spaces where pressure is low among gaps filled with the oil 42, and then agglomerate into large air bubbles there. FIG. 7 is a cross-sectional view showing positions where the air bubbles tend to appear. The air bubbles 43 tend to accumulate in the intermediate region 32E between the first region 32B and the second region 32C, the perimeter of the flange 33, and their vicinities, as shown in FIG. 7. When those air bubbles are large and many, or when those swell with variations of outside air pressure or temperature rises of the oil 42, the oil 42 is pushed and shifts by the pressure of the air bubbles. Thereby, the oil 42 tends to escape outward from the gap between the top of the shaft 31 and the upper opening of the sleeve 32 (see droplets 42A shown in FIG. 7.) Furthermore, a so-called lack of oil film, that is, a condition that the oil 42 fails to cover the whole of the radial dynamic-pressure generating grooves and the thrust dynamic-pressure generating grooves, occurs when the amount of leakage of the oil 42 is excessive. In that case, the above-described pumping effects become insufficient, and this increases, for example, the risk of excessively hard contact between the shaft 31 and the sleeve 32 or between the flange 33 and the thrust plate 34 resulting in serious wear of them.

SUMMARY OF THE INVENTION

An object of the present invention is to provide a hydrodynamic bearing that prevents in gaps the agglomeration of microbubbles intruding inside a lubricant by allowing them to easily escape out of the gaps, and reliably maintains a lubricant-filled condition of the whole of radial dynamic-pressure generating grooves and thrust dynamic-pressure generating grooves, thereby ensuring high reliability.

A hydrodynamic bearing according to the present invention comprises:

(a) a shaft;

(b) a flange being a substantial disc and fixed on one end of the shaft;

(c) a sleeve, when the shaft is inserted into its inside, allowed to revolve around the shaft and placed where a hollow provided on an inner surface of the sleeve is in the vicinity of a surface of the flange;

(d) a thrust plate hermetically sealing a first opening end of the sleeve, thereby being placed close to the flange when the shaft is inserted inside the sleeve; and (e) a lubricant with which the whole of radial dynamic-pressure generating grooves provided at least one of a side of the shaft and an inner surface of the sleeve, and the whole of thrust dynamic-pressure generating grooves provided at least one of the surfaces of the flange and the thrust plate opposed to each other, are filled and covered. In this hydrodynamic bearing, in particular, inequalities $A<B$, $A<D$, $C<B$, $C<D$, $B<H$, $D<H$, and $G<H$ all hold, where A is a distance in the axial direction of the shaft between the flange and the thrust plate over the thrust dynamic-pressure generating groove and its vicinity, B is a distance in the radial direction of the shaft between a perimeter of the flange and the above-described hollow of the sleeve, C is a distance in the axial direction of the shaft between the flange and the above-described hollow of the sleeve, D is a distance in the radial direction of the shaft between the shaft and the sleeve around the joint between the shaft and the flange, G is a distance in the radial direction of the shaft between the shaft and the sleeve over the radial dynamic-pressure generating groove and its vicinity, and H is a distance in the radial direction of the shaft between the shaft and the sleeve at a second opening end of the sleeve.

For example, a disk recording/reproducing apparatus is equipped with this hydrodynamic bearing according to the present invention. Here, the disk recording/reproducing apparatus comprises:

(a) a base on which one of the shaft and the sleeve is fixed;

(b) a hub connected to another of the shaft and the sleeve that is not fixed on the base and allowed to revolve around the shaft;

(c) a motor installed between the base and the hub, including a magnet and a coil, and for exerting to the hub a torque for a revolution around the shaft;

(d) a magnetic disk concentrically fixed on the hub; and (e) a head, when the magnetic disk revolves because of the torque, being placed close to a surface of the magnetic disk, recording a signal onto the magnetic disk, and reproducing a signal from the magnetic disk.

In the above-described hydrodynamic bearing according to the present invention, the lubricant flows along the radial dynamic-pressure generating grooves and is concentrated in predetermined regions when the shaft or the sleeve revolves around the shaft. As a result, pressure in the radial direction of the shaft rises in gaps between the shaft and the sleeve. This pumping effect maintains stable spacing between the shaft and the sleeve, and thus, the axis of rotation of the shaft or the sleeve does not substantially shift in the radial direction of the shaft. Similarly, the lubricant flows along the thrust dynamic-pressure generating grooves and is concentrated in predetermined regions. As a result, pressure in the axial direction of the shaft rises on surfaces of the flange. This pumping effect maintains stable spacing between the flange and the hollow of the sleeve and stable spacing between the flange and the thrust plate. Therefore, the axis of rotation of the shaft or the sleeve does not substantially tilt from the axial direction of the shaft. Thus, the above-described hydrodynamic bearing according to the present invention maintains high-speed revolutions of the shaft or the sleeve stable with high precision.

In the above-described hydrodynamic bearing according to the present invention, gaps among the sleeve, the shaft, the flange, and the thrust plate are set as described above. More specifically, the gaps over the thrust dynamic-pressure generating grooves and their vicinities are narrower than the surrounding gaps. Furthermore, the surrounding gaps are narrower than the gaps in the second opening end of the sleeve and its vicinity. In addition, the gaps over the radial dynamic-pressure generating grooves and their vicinities are narrower than the gaps in the second opening end of the sleeve and its vicinity. In that case, the sealing force of lubricant is the strongest over the thrust dynamic-pressure generating grooves and their vicinities, next stronger in the gaps surroundings the flange, and the weakest in the second opening end of the sleeve and its vicinity. Furthermore, the sealing force over the radial dynamic-pressure generating grooves and their vicinities is stronger than the sealing force in the second opening end of the sleeve and its vicinity. Such a gradient of sealing force keeps microbubbles in the lubricant away from the vicinities of the thrust dynamic-pressure generating grooves and the radial dynamic-pressure generating grooves, and, in addition, pushes them back into the second opening end of the sleeve. The microbubbles, in particular, hardly reach in the vicinity of the perimeter of the flange. Thus, occurrences of the air bubbles due to the agglomeration of the microbubbles are prevented, and leakage of lubricant due to the occurrence and swelling of the air bubbles are avoided. Accordingly, the lubricant keeps covering the whole of the radial dynamic-pressure generating grooves and the thrust dynamic-pressure generating grooves with stability, that is, no so-called lack of oil film occurs. In other words, the above-described pumping effects are maintained with stability, and thus, spacing between the shaft and the sleeve is maintained with stability. Therefore, the above-described hydrodynamic bearing according to the present invention has high reliability.

In the above-described hydrodynamic bearing according to the present invention, the radial dynamic-pressure generating grooves may be provided in two regions, a first region near the flange and a second region near the second opening end of the sleeve. In that case, it is preferable that inequalities $E<D$, $E<F$, $G<D$, $G<F$, and $F<H$ all hold, where E is a distance in the radial direction of the shaft between the shaft and the sleeve in the first region, F is a distance in the radial direction of the shaft between the shaft and the sleeve in an intermediate region between the first region and the second region, and G is a distance in the radial direction of the shaft between the shaft and the sleeve in the second region. Thereby, the gaps in the first and second regions and their vicinities, that is, the gaps over the radial dynamic-pressure generating grooves and their vicinities, are narrower than the surrounding gaps. Furthermore, the surrounding gaps are narrower, than the gaps in the second opening end of the sleeve and its vicinity. In that case, the sealing force of lubricant is the strongest over the radial dynamic-pressure generating grooves and their vicinities, next stronger in the gaps in an intermediate region between the second region and the flange and its vicinity, and the gaps in the intermediate region between the first region and the second region and its vicinity, and the weakest in the second opening end of the sleeve and its vicinity. Such a gradient of sealing force keeps microbubbles in the lubricant away from the vicinities of the radial dynamic-pressure generating grooves, and, in addition, pushes them back into the second opening end of the sleeve. The microbubbles, in particular, hardly accumulate in the intermediate region between the first region and the second region. Thus, occurrences of the air bubbles due to the agglomeration of the microbubbles are prevented, and leakage of lubricant due to the occurrence and swelling of the air bubbles are avoided. Accordingly, the lubricant keeps covering the whole of the radial dynamic-pressure generating grooves with stability, that is, no so-called lack of oil film occurs. In other words, the above-described, radial pumping effect is maintained with stability, and thus, spacing between the shaft and the sleeve is maintained with stability. Therefore, the above-described hydrodynamic bearing according to the present invention has still higher reliability.

In the above-described hydrodyamic bearing according to the present invention, preferably, the lubricant is composed of one of oil and grease, and shows a kinematic viscosity of at least $4 \times 10^{-6}$ m²/s at 40 degrees centigrade. Such a lubricant remarkably reduces a rate of the intrusion of air bubble. For example, diester-based or polyester-based lubricant is suitable for the above-described lubricant. The utilization of such a lubricant further effectively prevents leakage of lubricant due to the occurrence and swelling of air bubbles. Accordingly, the above-described hydrodynamic bearing according to the present invention has still higher reliability.

The above-described hydrodynamic bearing according to the present invention has high reliability as described above. When a disk recording/reproducing apparatus is equipped with the hydrodynamic bearing, the revolution of magnetic disks can further become faster and be further stabilized with higher precision in the disk recording/reproducing apparatus. As a result, increases in capacity and speedups of data transfers can be easily enhanced. In addition, the disk recording/reproducing apparatus can maintain high reliability for a long time.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

The following describes the best embodiments of the present invention, with referring to the figures.

Figure 5:
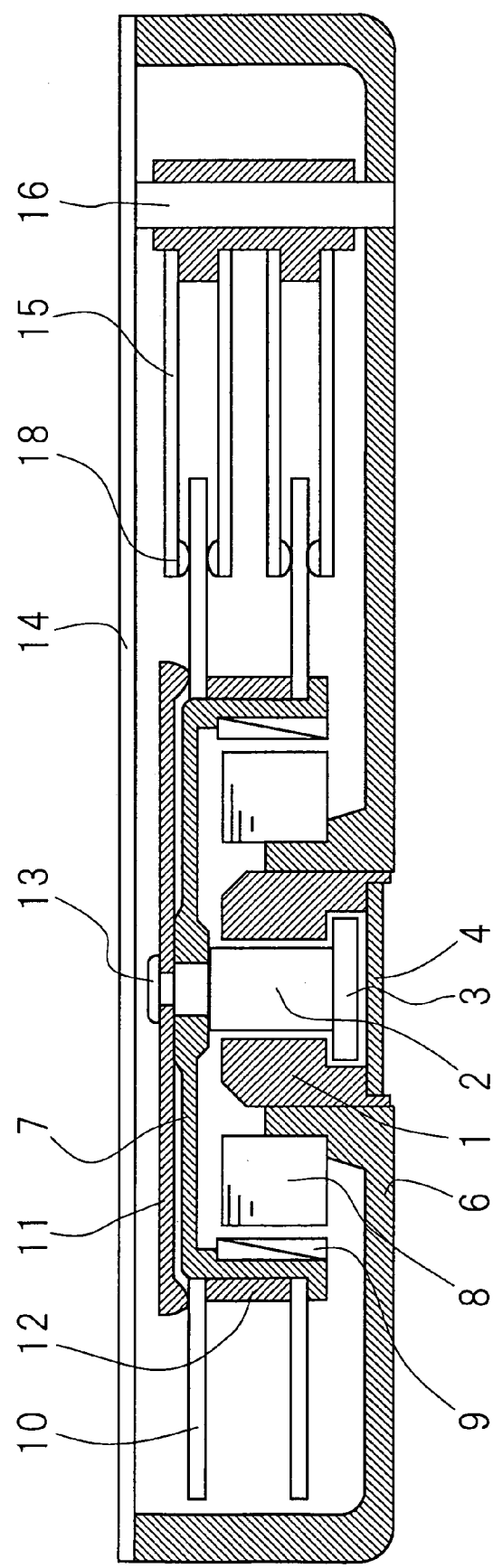
FIG. 5 is a cross-sectional view of a disk recording/reproducing apparatus according to the embodiment of the present invention.
Figure 6:
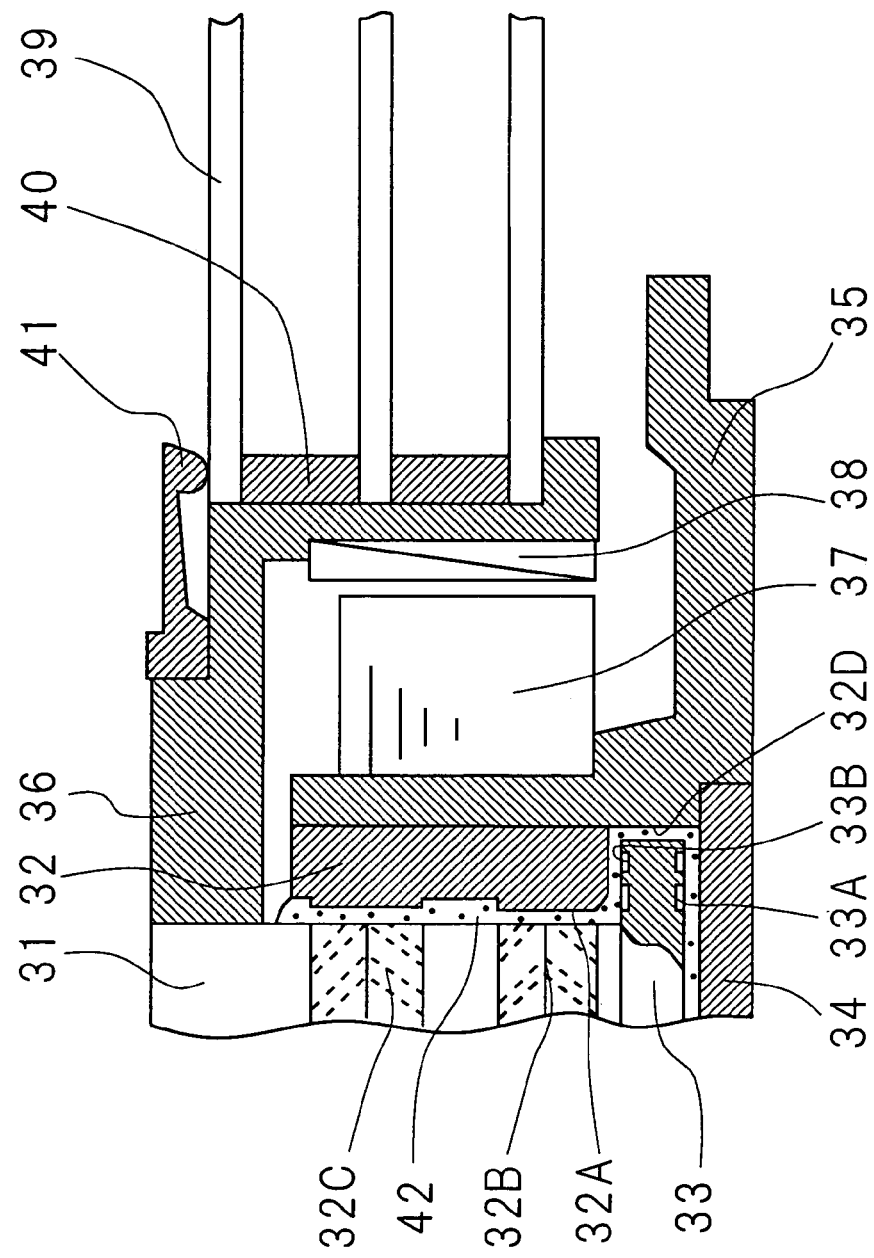
FIG. 6 is a cross-sectional view of an example of conventional hydrodynamic bearings.
Figure 7:
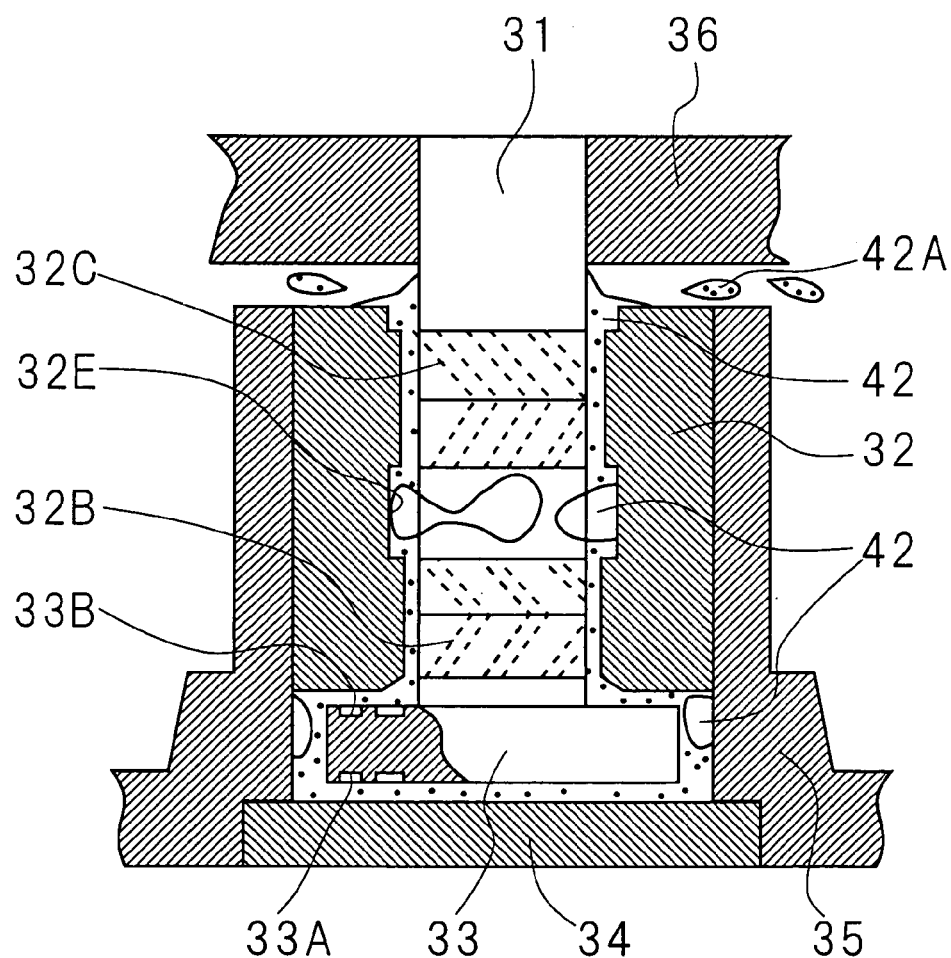
FIG. 7 is a cross-sectional view showing positions where air bubbles tend to appear, for the conventional hydrodynamic bearing shown in FIG. 6.

FIG. 5 is a cross-sectional view of a disk recording/reproducing apparatus according to an embodiment of the present invention. This disk recording/reproducing apparatus comprises a base 6, a hydrodynamic bearing, a hub 7, stators 8, magnets 9, magnetic disks 10, a clamper 11, spacers 12, a cover 14, swing arms 15, and a support 16. The hydrodynamic bearing comprises a sleeve 1, a shaft 2, a flange 3, and a thrust plate 4. The base 6 and the cover 14 are fit to each other, thereby forming a box-shaped cabinet. Then, the base 6 and the cover 14 enclose the inside of the cabinet, thereby protecting it against intrusion by foreign substances such as dust from the outside. The sleeve 1 is inserted into a hole in the base 6 and is fixed there. The thrust plate 4 hermetically seals the lower opening end of the sleeve 1. Here, the thrust plate 4 is fixed at the lower opening end of the sleeve 1 by, for example, laser welding, precision swaging, or bonding. Alternatively, the thrust plate 4 may be fixed on the base 6. The shaft 2 is inserted into the sleeve 1 and allowed to revolve around itself. The flange 3 is fixed on the bottom end of the shaft 2, and then its lower surface is placed close to the upper surface of the thrust plate 4. The top end of the shaft 2 is fixed to the hub 7 with a screw 13. Thus, the hub 7 surrounding the sleeve 1 revolves around the shaft 2. Alternatively, the shaft 2 may be fixed on the base 6 and the sleeve 1 may be fixed to the hub 7. In that case, the hub 7 revolves around the shaft 2 together with the sleeve 1. The magnetic disks 10 are fixed on outer surfaces of the hub 7, being concentric with the shaft 2. For example, several sheets of the magnetic disks 10 are installed. Here, the number of the magnetic disk 10 may be one. The spacers 12 are installed between inner radii of the magnetic disks 10, and, in addition, the clamper 11 presses down the inner radii of the magnetic disks 10 from the top. Thereby, the magnetic disks 10 are fixed on the hub 7. The stators 8 are fixed on the base 6 around the sleeve 1. On the other hand, the magnets 9 are installed on inner surfaces of the hub 7 and opposed to the stators 8. The bottom end of the support 16 is fixed on the base 6. The swing arms 15 comprise the heads 18 at their tips, and are connected at their rear ends to the support 16, being allowed to swing. One of the swing arms 15 is provided for one side each of the magnetic disks 10.

Figure 1:
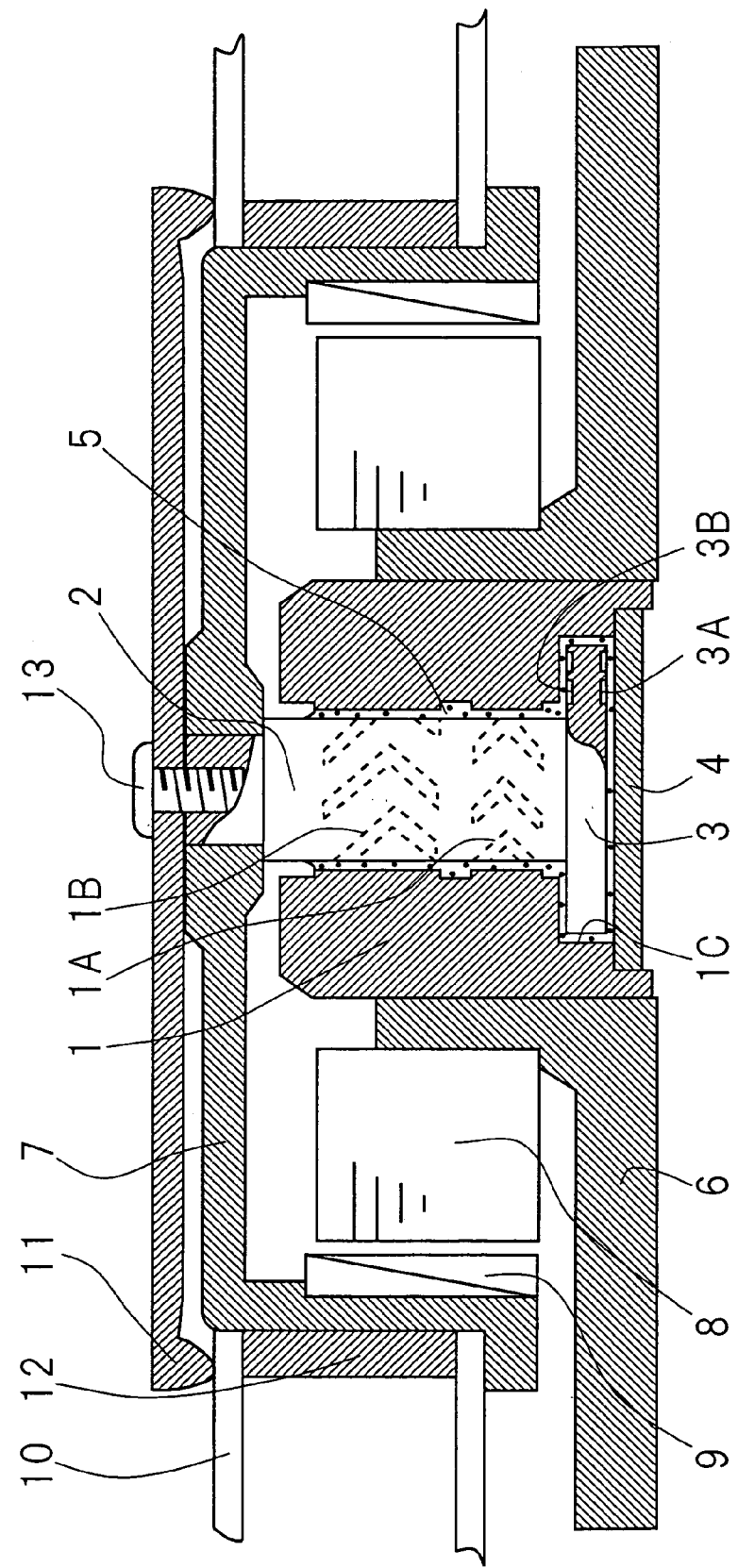
FIG. 1 is a cross-sectional view of a hydrodynamic bearing according to an embodiment of the present invention.

FIG. 1 is a cross-sectional view of the above-described hydrodynamic bearing. Radial dynamic-pressure generating grooves are provided, for example, in two separated regions on the inner surface of the sleeve 1 (see broken lines shown in FIG. 1.) Of those two regions, let a first region 1A be one region in the flange 3 side and a second region 1B be another region in the base 1 side. Radial dynamic-pressure generating grooves may be provided on the side of the shaft 2 instead of or in addition to the inner surface of the sleeve 1. Radial dynamic-pressure generating grooves are, for example, herringbone-shaped grooves. Alternatively, radial dynamic-pressure generating grooves may be shaped into spirals. A hollow 1C is provided at the lower opening end of the inner surface of the sleeve 1. The flange 3 is placed inside the hollow 1G. Thrust dynamic-pressure generating grooves 3A and 3B are provided on upper and lower surfaces of the flange 3, respectively. Alternatively, thrust dynamic-pressure generating grooves may be provided only on one side of the flange 3. Thrust dynamic-pressure generating grooves may be provided on one or both of a surface of the above-described hollow 1C of the sleeve 1 and the upper surface of the thrust plate 4, instead of or in addition to the surface of the flange 3. Thrust dynamic-pressure generating grooves are, for example, herringbone-shaped grooves. Alternatively, thrust dynamic-pressure generating grooves may be provided only on one side of hte flange 3. Thrust dynamic-pressure generating grooves may be provided on one or both of a surface of the above-described hollow 1C of the sleeve 1 and the upper surface of the thrust plate 4, instead of or in addition to the surface of the flange 3. Thrust dynamic-pressure generating grooves are, for example, herringone-shaped grooves. Alternatively, thrust dynamic-pressure generating grooves may be shaped into spirals. A lubricant 5 is preferably oil, or alternatively, may be grease. With the lubricant 5, gaps between the sleeve 1 (or the thrust plate 4) and the shaft 2 (or the flange 3) are filled.

When the above-described disk recording/reproducing apparatus performs recording/reproducing of data for the magnetic disks 10, the above-described hydrodynamic bearing operates as follows (see FIGS. 1 and 5.) Rotating magnetic fields occur when the stators 8 are energized. The hub 7 undergoes a torque from the rotating magnetic fields through the magnets 9. Thereby, the shaft 2, the hub 7, and the magnetic disks 10 in a body revolve around the shaft 2. During the revolution, the lubricant 5 flows along the radial dynamic-pressure generating grooves in the first region 1A and the second region 1B and their vicinities, and is concentrated in the central parts of the respective regions. As a result, pressure in the radial direction of the shaft 2 rises in those central parts. This pumping effect maintains stable spacing between the sleeve 1 and the shaft 2, and thereby, the axis of revolution of the magnetic disks 10 does not substantially shift in the radial direction of the shaft 2. Similarly, the lubricant 5 flows along the thrust dynamic-pressure generating grooves 3A and 3B on the surfaces of the flange 3, and is concentrated on the middle parts of the respective surfaces of the flange 3. As a result, pressure in the axial direction of the shaft 2 rises on the surfaces of the flange 3. This pumping effect maintains stable spacing between the hollow 1C at the lower opening end of the sleeve 1 and the flange 3, and stable spacing between the flange 3 and the thrust plate 4. Therefore, the axis of revolution of the magnetic disks 10 does not substantially tilt from the axial direction of the shaft 2. Thus, the above-described hydrodynamic bearing maintains the high-speed revolution of the magnetic disks 10 stable with high precision.

At the high-speed revolution of the magnetic disks 10, the swing arms 15 swing around the support 16, and move the heads 18 to destinations over the magnetic disks 10. Here, the head 18 floats at a minute distance from the surface of the magnetic disk 10 because of the high-speed revolution of the magnetic disk 10. At the destinations over the magnetic disks 10, the heads 18 write data onto the magnetic disks 10, or read data from the magnetic disks 10. Here, the above-described hydrodynamic bearing maintains the high-speed revolution of the magnetic disks 10 stable with high precision, and therefore the reading and writing of data by the heads 18 have high reliability.

Figure 2:
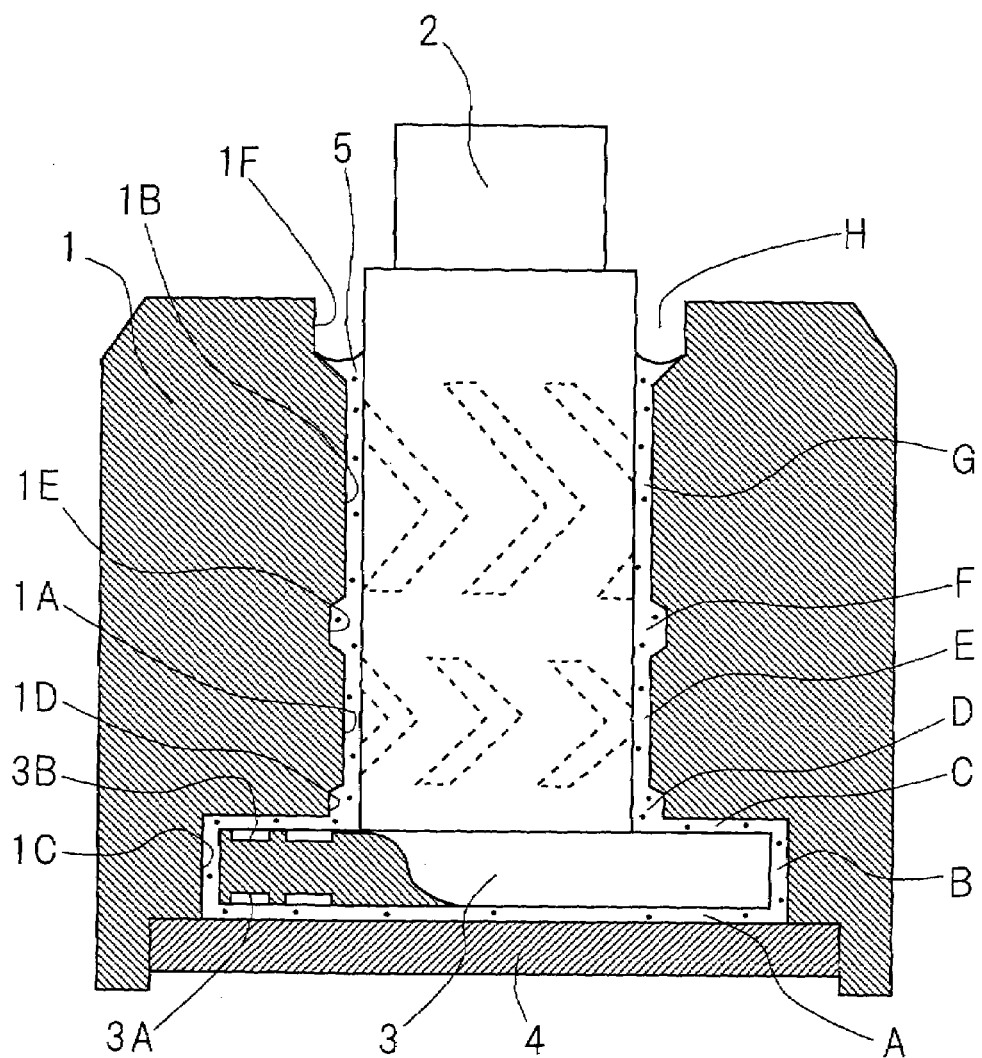
FIG. 2 is a cross-sectional view showing details of the hydrodynamic bearing according to the embodiment of the present invention.

In the above-described hydrodynamic bearing according to the embodiment of the present invention, in particular, the gaps among the sleeve 1, the shaft 2, the flange 3, and the thrust plate 4 vary in size from place to place as follows. FIG. 2 is a cross-sectional view showing details of the above-described hydrodynamic bearing. A plurality of hollows is provided on the inner surface of the sleeve 1. Those hollows are, in ascending order of vertical position, the hollow 1C at the lower opening end, a small hollow 1D immediately above it, an intermediate region 1E between the first region 1A and the second region 1B, and a hollow 1F at the upper opening end. Axial and radial directions hereafter refer to the axial and radial directions of the shaft 2, respectively. Let A be an axial distance in the gap A between the thrust plate 4 and the thrust dynamic-pressure generating grooves 3A on the lower surface of the flange 3, B be a radial distance in the gap B between the perimeter of the flange 3 and the hollow 1C at the lower opening end of the sleeve 1, C be an axial distance in the gap C between the thrust dynamic-pressure generating grooves 3B on the upper surface of the flange 3 and the hollow 1C at the lower opening end of the sleeve 1, D be a radial distance in the gap D between the small hollow 1D of the sleeve 1 and the shaft 2, E be a radial distance in the gap E between the first region 1A of the sleeve 1 and the shaft 2, F be a radial distance in the gap F between the intermediate region 1E of the sleeve 1 and the shaft 2, G be a radial distance in the gap G between the second region 1B of the sleeve 1 and the shaft 2, and H be a radial distance in the gap H between the hollow 1F at the upper opening end of the sleeve 1 and the shaft 2 (here, the gaps and the distances are represented by the same reference symbols in order to clarify the correspondences between them.) Then, inequalities A<B, A<D, C<B, C<D; B<H, D<H; E<D, E<F, G<D, and G<F<H all hold. In other words, the gaps A and C in the thrust dynamic-pressure generating grooves 3A and 3B and their vicinities are narrower than the surrounding gaps B and D (A<B, A<D, C<B, C<D), and the surrounding gaps B and D are narrower than the gap H at the upper opening end of the sleeve 1 and its vicinity (B<H, D<H.) In addition, the gaps E and G in the radial dynamic-pressure generating grooves and their vicinities are narrower than the surrounding gaps D and F (E<D, E<F, G<D, G<F), and the surrounding gaps D and F are narrower than the gap H at the upper opening end of the sleeve 1 and its vicinity (D<H, F<H.)

Figure 4:
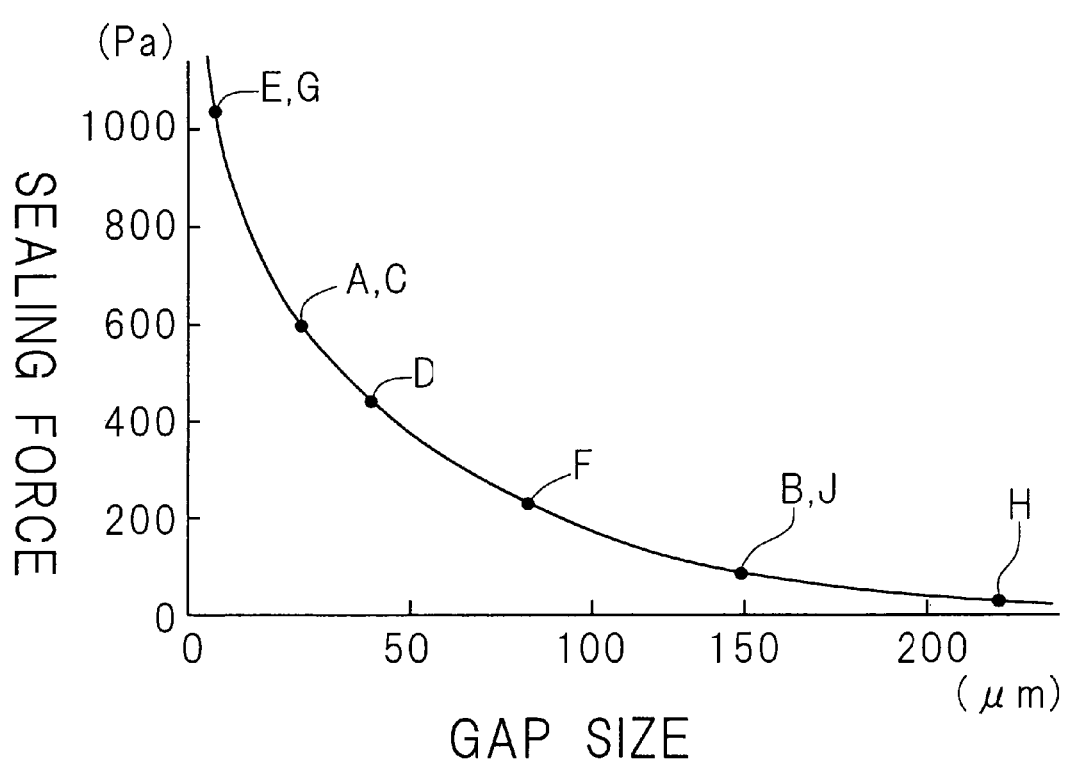
FIG. 4 is a graph showing a relation between gap sizes and sealing forces of lubricant for the hydrodynamic bearing according to the embodiment of the, present invention.

Generally, the narrower gaps, the stronger the sealing force of the lubricant 5 with which the gaps are filled. FIG. 4 is a graph showing a relation between gap sizes and sealing forces of the lubricant 5 for the hydrodynamic bearing according to the embodiment of the present invention. In FIG. 4, the horizontal and vertical axes show gap sizes in micrometers (µm) and sealing forces in Pascals (Pa), respectively. FIG. 4, in particular, shows an example of correspondences between gap sizes and sealing forces of the lubricant 5 for the respective gaps A, B, C, . . . , and H shown in FIG. 2. As shown in FIG. 4, the sealing force of the lubricant 5 is the strongest in the gaps A and C over the thrust dynamic-pressure generating grooves and their vicinities and the gaps E and G over the radial dynamic-pressure generating grooves and their vicinities, next stronger in their surrounding gaps B, D, and F, and the weakest in the gap H at the upper opening end of the sleeve 1 and its vicinity. Such a gradient of sealing force keeps microbubbles in the lubricant 5 away from the vicinities A and C of the thrust dynamic-pressure generating grooves and the vicinities E and G of the radial dynamic-pressure generating grooves, and further pushes them back into the upper opening end of the sleeve 1. The microbubbles, in particular, hardly accumulate in the gap in the intermediate region 1E of the sleeve 1 and its vicinity, and, in addition, hardly reach the gap B around the perimeter of the flange 3 and its vicinity. Thus, occurrences of air bubbles due to the agglomeration of the microbubbles are prevented, and leakage of the lubricant 5 due to the occurrence and swelling of the air bubbles are avoided. Accordingly, the lubricant 5 keeps covering the whole of the radial dynamic-pressure generating grooves and the thrust dynamic-pressure generating grooves with stability, that is, no so-called lack of oil film occurs. In other words, the above-described pumping effects are maintained with stability, and thus, spacing between the sleeve 1 and the shaft 2 is maintained with stability. Therefore, the above-described hydrodynamic bearing according to the embodiment of the present invention has particularly high reliability.

FIG. 4 is only one example out of many, showing the correspondences between the sizes of the gaps A–H and the sealing forces of the lubricant 5 shown in FIG. 2. In order to cause the sealing forces of the lubricant 5 to prevent the microbubbles from intruding into the lubricant 5 as described above, the gaps A–H may be set as follows. Radial distances may be set in the 1–10 µm range in the gap E in the first region 1A and its vicinity and the gap G in the second region 1B and its vicinity. Axial distances may be set in the 10–60 µm range in the gaps A and C in the thrust dynamic-pressure generating grooves 3A and 3B and their vicinities. Radial distances may be set in the 20–100 µm range in the gaps D and F in the adjacent regions of the first region 1A. A radial distance may be set in the 50–300 µm range in the gap B between the hollow 1C at the lower opening end of the sleeve 1 and the perimeter of the flange 3. A radial distance may be set in the 50–800 µm range in the gap H between the shaft 2 and the hollow 1F at the upper opening end of the sleeve 1.

In the above-described hydrodynamic bearing according to the embodiment of the present invention, preferably, the lubricant 5 shows a kinematic viscosity of at least $4 \times 10^{-6}$ $m^2/s$ at 40 degrees centigrade. When the kinematic viscosity of the lubricant 5 satisfies the condition, a rate of the intrusion of air bubble is remarkably reduced. This fact is revealed by the construction of the above-described hydrodynaniic bearing from transparent members and the observation of the intrusion of the microbubbles into the lubricant 5 during the operation. Accordingly, diester-based or polyolester-based lubricant, for example, is suitable for the lubricant 5. The utilization of such a lubricant 5 further effectively prevents leakage of the lubricant 5 due to the occurrence and swelling of air bubbles. Accordingly, the above-described hydrodynamic bearing according to the present invention has still higher reliability.

Figure 3:
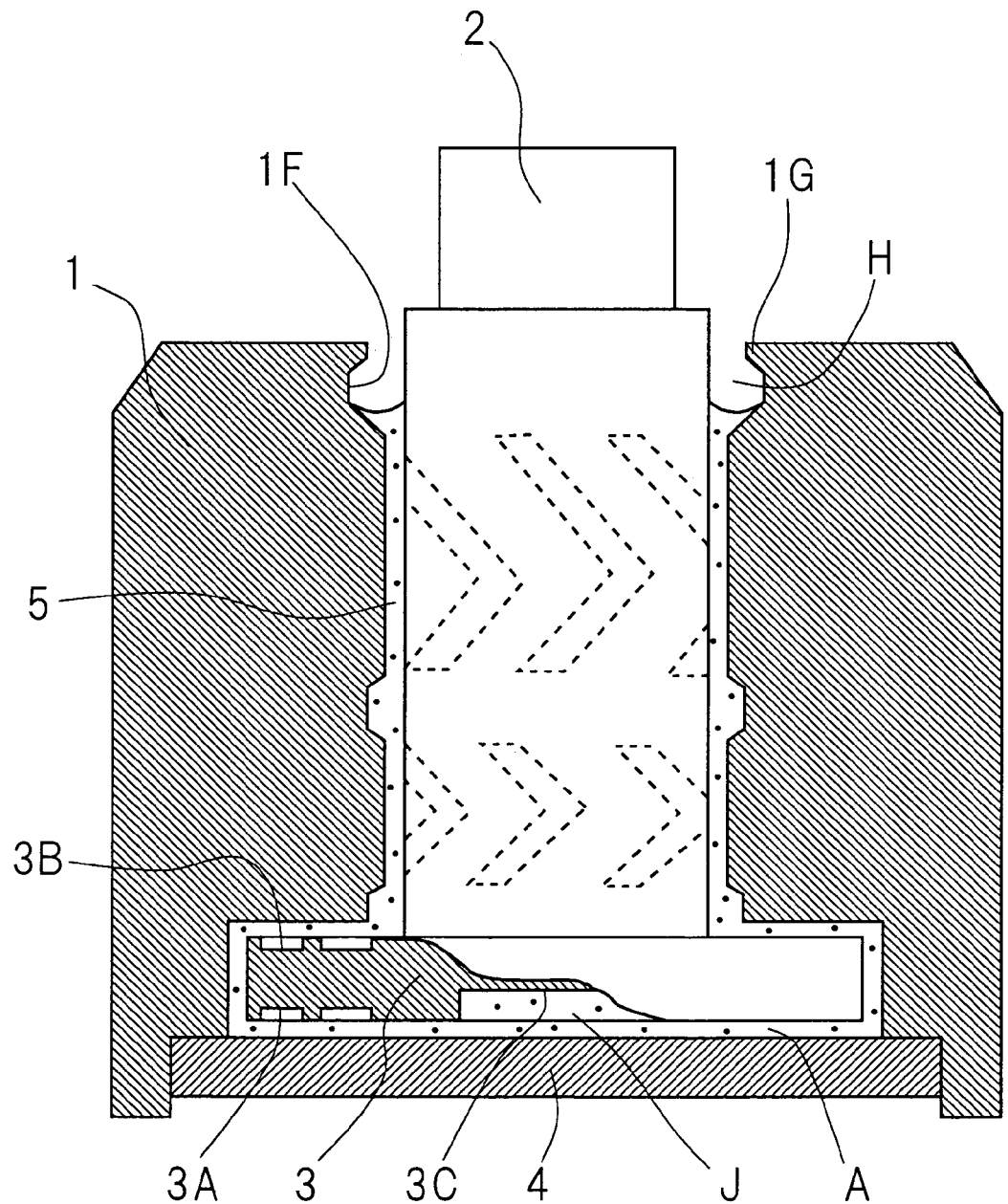
FIG. 3 is a cross-sectional view showing an example of variations of the hydrodynamic bearing according to the embodiment of the present invention.

In the above-described hydrodynamic bearing according to the embodiment of the present invention, a similar plurality of hollows may be provided on the side of the shaft 2, instead of or in addition to the inner surface of the sleeve 1. Furthermore, shapes other than the above-described plurality of the hollows 1C–1F may be added on the inner surface of the sleeve 1, the side of the shaft 2, or the surfaces of the flange 3. FIG. 3 is a cross-sectional view showing details of a variation of the hydrodynamic bearing according to the embodiment of the present invention. In FIG. 3, components similar to components shown in FIG. 2 are marked with the same reference symbols as the reference symbols shown in FIG. 2. A hollow 3C may be provided on the inner radius of the lower surface of the flange 3, as shown in FIG. 3. In that case, the gap under the flange 3 at the inner radii of the flange 3 and the vicinity J is broader than the gap over the thrust dynamic-pressure generating grooves 3A and their vicinity A. Accordingly, the sealing force of the lubricant 5 at the inner radii of the flange 3 and the vicinity J is weaker than the sealing force over the thrust dynamic-pressure generating grooves 3A and their vicinity A (see FIG. 4.) Therefore, the lubricant 5 in the gap under the flange 3 is concentrated particularly over the thrust dynamic-pressure generating grooves 3A and their vicinity A, thus keeping reliably covering the whole of the thrust dynamic-pressure generating grooves 3A. In addition, let H be a distance in the radial direction of the shaft 2 in the gap H between the hollow 1F at the upper opening end of the sleeve 1 and the shaft 2, and J be a distance in the axial direction of the shaft 2 in the gap J at the inner radii of the flange 3 and the vicinity, then an inequality J<H holds. For example, the above-described distance J in the gap J at the inner radii of the flange 3 and the vicinity may be set in the 50–300 µm range. Then, the sealing force of the lubricant 5 at the inner radii of the flange 3 and the vicinity J is stronger than the sealing force in the hollow 1F at the upper opening end of the sleeve 1 and its vicinity H (see FIG. 4.) As a result, the microbubbles hardly accumulate into the inner radii of the flange 3 and the vicinity J.

A small protrusion 1G may be further provided to be adjacent to the upper side of the hollow 1F of the upper opening end of the sleeve 1, as shown in FIG. 3. The small protrusion 1G narrows the area of the upper opening of the sleeve 1, thereby protecting the gaps between the sleeve 1 and the shaft 2 against intrusion by dust and air. Here, the existence of the small protrusion 1G of the sleeve 1 does not impair the above-described effect due to the gap H between the hollow 1F at the upper opening end of the sleeve 1 and the shaft 2 larger than the other gaps A–G, that is, the elimination effect of microbubbles due to the gradient of the sealing force.

The hydrodynamic bearing according to the present invention maintains the high-speed revolution of the sleeve stable with high precision and prevents leakage of lubricant due to the agglomeration of microbubbles, as described above, thereby having high reliability. Disk recording/reproducing apparatuses equipped with these hydrodynamic bearings can easily realize further increases in capacity and further speedups of data transfer, and maintain high reliability for a long time. Accordingly, the installation of the hydrodynamic bearings on disk recording/reproducing apparatuses has very high utility in industry.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

The invention claimed is:

1. A hydrodynamic bearing comprising;
   (a) a shaft;
   (b) a flange being a substantial disc and fixed on one end of said shaft;
   (c) a sleeve, when said shaft is inserted into its inside, allowed to revolve around said shaft and placed where a hollow provided on an inner surface of said sleeve is in the vicinity of a surface of said flange;
   (d) a thrust plate hermetically sealing a first opening end of said sleeve, thereby being placed close to said flange when said shaft is inserted inside said sleeve; and
   (e) a lubricant with which the whole of radial dynamic-pressure generating grooves provided at least one of a side of said shaft and an inner surface of said sleeve, and the whole of thrust dynamic-pressure generating grooves provided at least one of the surfaces of said flange and said thrust plate opposed to each other, are filled and covered; wherein:
   inequalities A<B, A<D, C<B, C<D, B<H, D<H, and G<H all hold, where A is a distance in the axial direction of said shaft between said flange and said thrust plate over said thrust dynamic-pressure generating groove and its vicinity, B is a distance in the radial direction of said shaft between a perimeter of said flange and said hollow of said sleeve, C is a distance in the axial drrection of said shaft between said flange and said hollow of said sleeve, D is a distance in the radial direction of said shaft between said shaft and said sleeve around the joint between said shaft and said flange, G is a distance in the radial direction of said shaft between said shaft and said sleeve over said radial dynamic-pressure generating groove and its vicinity, and H is a distance in the radial direction of said shaft between said shaft and said sleeve at a second opening end of said sleeve.

2. A hydrodynamic bearing according to claim 1, wherein:
said radial dynamic-pressure generating grooves are provided in two regions, a first region near said flange and a second region near said second opening end of said sleeve; and inequalities E<D, E<F, G<D, G<F, and F<H, all hold where E is a distance in the radial direction of said shaft between said shaft and said sleeve in said first region, F is a distance in the radial direction of said shaft between said shaft and said sleeve in an intermediate region between said first region and said second region, and G is a distance in the radial direction of said shaft between said shaft and said sleeve in said second region.

3. A hydrodynamic bearing according to claim 1, wherein said lubricant is composed of one of oil and grease, and shows a kinematic viscosity of at least $4 \times 10^{-6}$ m$^2$/s at 40 degrees centigrade.

4. A disk recording/reproducing apparatus comprising:
(a) a hydrodynamic bearing comprising:
  (i) a shaft;
  (ii) a flange being a substantial disc and fixed on one end of said shaft;
  (iii) a sleeve, when said shaft is inserted into its inside, allowed to revolve around said shaft and placed where a hollow provided on an inner surface of said sleeve is in the vicinity of a surface of said flange;
  (iv) a thrust plate hermetically scaling a first opening end of said sleeve, thereby being placed close to said flange when said shaft is inserted inside said sleeve; and
  (v) a lubricant with which the whole of radial dynamic-pressure generating grooves provided at least one of a side of said shaft and an inner surface of said sleeve, and the whole of thrust dynamnic-pressure generating grooves provided at least one of the surfaces of said flange and said thrust plate opposed to each other, are filled and covered; wherein:
inequalities A<B, A<D, C<B, C<D, B<H, D<H, and G<H all hold, where A is a distance in the axial direction of said shaft between said flange and said thrust plate over said thrust dynamic-pressure generating groove and its vicinity, B is a distance in the radial direction of said shaft between a perimeter of said flange and said hollow of said sleeve, C is a distance in the axial direction of said shaft between said flange and said hollow of said sleeve, D is a distance in the radial direction of said shaft between said shaft and said sleeve around the joint between said shaft and said flange, G is a distance in the radial direction of said shaft between said shaft and said sleeve over said radial dynamic-pressure generating groove and its vicinity, and H is a distance in the radial direction of said shaft between said shaft and said sleeve at a second opening end of said said sleeve;

(b) a base on which one of said shaft and said sleeve is fixed;
(c) a hub connected to another of said shaft and said sleeve that is not fixed on said base and allowed to revolve around said shaft;
(d) a motor installed between said base and said hub, including a magnet and a coil, and for exerting to said hub a torque for a revolution around said shaft;
(e) a magnetic disk concentrically fixed on said hub; and
(f) a head, when said magnetic disk revolves because of said torque, being placed close to a surface of said magnetic disk, recording a signal onto said magnetic disk, and reproducing a signal from said magnetic disk.

5. A disk recording/reproducing apparatus according to claim 4, wherein:
said radial dynamic-pressure generating grooves are provided in two regions, a first region near said flange and a second region near said second opening end of said sleeve, and inequalities E<D, E<F, F<H, G<D, and G<F, all hold where E is a distance in the radial direction of said shaft between said shaft and said sleeve in said first region, F is a distance in the radial direction of said shaft between said shaft and said sleeve in an intermediate region between said first region and said second region, and G is a distance in the radial direction of said shaft between said shaft and said sleeve in said second region.

6. A disk recording/reproducing apparatus according to claim 4, wherein said lubricant is composed of one of oil and grease, and shows a kinematic viscosity at at least $4 \times 10^{-6}$ m$^2$/s at 40 degrees centigrade.

* * * * *

UNITED STATES PATENT AND TRADEMARK OFFICE
CERTIFICATE OF CORRECTION

PATENT NO. : 7,102,851 B2  Page 1 of 1
APPLICATION NO. : 10/727448
DATED : September 5, 2006
INVENTOR(S) : Takafumi Asada et al.

It is certified that error appears in the above-identified patent and that said Letters Patent is hereby corrected as shown below:

<u>Column 11</u>:

Line 2, "drrection" should read -- direction --;

Line 38, "scaling" should read -- sealing --;

Line 45, "dynamnic" should read -- dynamic --;

<u>Column 12</u>:

Line 15, the second instance of "said" should be deleted;

Line 47: the first instance of "at" should be replaced with -- of --.

Signed and Sealed this

Twenty-seventh Day of March, 2007

JON W. DUDAS
*Director of the United States Patent and Trademark Office*